United States Patent [19]

Hayes et al.

[11] Patent Number: 4,611,051
[45] Date of Patent: Sep. 9, 1986

[54] NOVEL POLY(ESTER-AMIDE) HOT-MELT ADHESIVES

[75] Inventors: Kathryn S. Hayes, Norristown, Pa.; Charles R. Frihart, Lawrenceville, N.J.; Ronald J. Wroczynski, Pittsfield, Mass.

[73] Assignee: Union Camp Corporation, Wayne, N.J.

[21] Appl. No.: 815,340

[22] Filed: Dec. 31, 1985

[51] Int. Cl.$^4$ .................... C08G 63/54; C08G 63/48; C08G 63/44; C08G 69/44
[52] U.S. Cl. .................... 528/295.3; 528/288; 528/289; 528/295.5; 528/300; 528/302
[58] Field of Search .................... 528/288, 289, 295.3, 528/295.5, 300, 302

[56] References Cited

U.S. PATENT DOCUMENTS

| | | | |
|---|---|---|---|
| 3,235,520 | 2/1966 | Crowell | 528/295.3 |
| 4,207,217 | 6/1980 | Guainazzi et al. | 528/295.3 X |
| 4,397,991 | 8/1983 | Draweat et al. | 528/295.5 X |
| 4,485,233 | 11/1984 | Veazey | 528/295.3 |
| 4,569,985 | 2/1986 | Frihart et al. | 528/291 |

Primary Examiner—Lucille M. Phynes
Attorney, Agent, or Firm—Kane, Dalsimer, Kane, Sullivan and Kurucz

[57] ABSTRACT

In the present invention, poly(ester-amide) hot-melt adhesives are prepared from condensation of a mixture of polymeric fatty acids and 1,18-octadecanedicarboxylic acid, and a substantially equivalent proportion of a mixture of a polyamine and a polyol.

4 Claims, No Drawings

NOVEL POLY(ESTER-AMIDE) HOT-MELT ADHESIVES

BACKGROUND OF THE INVENTION

1. Field of the Invention

The present invention relates to poly(ester-amide) polymers, having hot-melt adhesive properties, and more particularly relates to poly(ester-amide) resins prepared by the reaction of a mixture of diamines and diols with a mixture of dimer acids and a specific class of aliphatic dicarboxylic acids.

2. Brief Description of the Prior Art

Poly(ester-amide) hot-melt adhesive compositions have been described in the prior art literature; see, for example, the descriptions given in the U.S. Pat. Nos. 377,303; 4,004,960; 4,341,670; and 4,343,743. These poly(ester-amides) are particularly useful for bonding polyvinyl chloride surfaces. We have now found that when a linear $C_{20}$-dibasic acid is used as a copolymerizing diacid with a polymeric fatty acid and various diamines and diols to prepare poly(ester-amide) hot-melt adhesives, resins are obtained which have increased moisture resistance and better tensile strengths at ambient temperature than when other copolymerizing diacids are used.

SUMMARY OF INVENTION

The present invention comprises a poly(ester-amide) adhesive composition with improved tensile strength and moisture resistance obtained by means of condensation of substantially equivalent proportions of a mixture of a polyamine, a polyol, and a mixture of dicarboxylic acids, said mixture comprising a polymerized fatty acid and eicosanedioic acid (1,18-octadecanedicarboxylic acid). The poly(ester-amide) compositions of the present invention are useful as hot-melt adhesives, particularly for the bonding of polyvinyl chloride films.

DETAILED DESCRIPTION OF THE PREFERRED EMBODIMENTS OF THE PRESENT INVENTION

The reactants employed to prepare the poly(ester-amide) compositions of the present invention are all known in the art, as are the methods of their preparation. The polymeric fatty acids, sometimes referred to in the art as "dimer acids," are complex mixtures resulting from the polymerization of tall oil-derived fatty acids. Representative of polymeric fatty acids are those commercially available from the polymerization of tall oil-derived fatty acids. These polymeric fatty acids have a typical composition as follows:

|  | % by Weight |
| --- | --- |
| $C_{18}$-monobasic acids (monomer) | 0–10 |
| $C_{36}$-dibasic acids (dimer) | 60–95 |
| $C_{54}$-and higher polybasic acids (trimer) | 1–35 |

The relative amounts of monomer, dimer, and trimer in unfractionated polymeric fatty acids are dependent on the nature of the starting material and the conditions of polymerization. Methods for the polymerization of fatty acids are described, for example, in the U.S. Pat. No. 3,157,681.

The polymeric fatty acid is employed in admixture with eicosanedioic acid (1,18-octadecanedicarboxylic acid); i.e., the dicarboxylic acid of formula:

$$HOOC-(CH_2)_{18}-COOH$$

The proportions of polymeric fatty acid and 1,18-octadecanedicarboxylic acid in the acid component-reactant used in the method of the invention may vary over a wide range. Preferred proportions are as follows:

Polymeric fatty acid: 95 to 40 equivalent %

1,18-octadecanedicarboxylic acid: 5 to 60 equivalent %

A variety of other dicarboxylic acids may also be employed together with the polymeric fatty acids and the 1,18-octadecanedicarboxylic acid in the preparation of the compositions of the invention. These additional dicarboxylic acids include aliphatic, cycloaliphatic, and aromatic dicarboxylic acids. Representative of such optional acids, which may contain from 2 to 20 carbon atoms, are oxalic, glutaric, malonic, adipic, succinic, suberic, azelaic, sebacic, dodecanedioic, and pimelic. Methods of preparing these preferred acids are well known, and they are available commercially.

Preferred additional or optional dicarboxylic acids employed in the invention are straight chain aliphatic diacids having at least 6 carbon atoms and more preferably 6 to 12 carbon atoms, for example, azelaic and sebacic acids, which are most preferred. It should be understood that use of the corresponding acid anhydrides, esters, and acid chlorides of these acids is included in the term "dicarboxylic acid."

The organic polyamines preferably employed in preparing the compositions of the present invention may be one or more of the known linear, aliphatic, cycloaliphatic, and aromatic diamines having from about 2 to 20 carbon atoms. Preferred, especially, are the alkylene diamines. Illustrative of the preferred optional diamines are ethylenediamine (EDA), 1,3-diaminopropane, 1,4-diaminobutane, 1,6-hexamethylenediamine (HMDA), 4,4'-methylene-bis-(cyclohexylamine), isophoronediamine, cyclohexane bis-(methylamines) and bis-1,4-(2-aminoethyl)benzene. Also preferred are polyglycol diamines such as Jeffamine ® D-2000 avaliable from Texaco, polyglycol diamine H-221 available from Union Carbide Corporation, and dimer diamine prepared from dimeric fatty acids. Most preferred are the secondary diamines such as piperazine (PIP), 1,3-di-(4-piperidyl) propane, and 1-(2-aminoethyl)piperazine (or diamines with an odd number of carbon atoms such as 1,3-diaminopropane). These diamine compounds are all prepared by well known methods and many are commercially available.

Diols employed in the present invention are also generally known compounds as are the methods of their preparation. Representative of preferred diols are straight chain aliphatic diols such as ethylene glycol, 1,3-propylene glycol, 1,4-butylene glycol, 1,6-hexamethylene glycol (HMDO), and the like and cyclic diols such as 1,4-bis(hydroxymethyl)cyclohexane (1,4-cyclohexane-dimethanol) and the like. Diols employed may also be polymeric, for example, polyalkylene oxides such as polyethylene glycols and polybutylene glycols of various molecular weights.

Preferred proportions of polyamine are from about 30 to 90 equivalent percent; preferred proportions of polyol are from about 10 to 70 equivalent percent.

The proportion of optional dicarboxylic acid, which may be used, may be within the range of from about 0 to about 50 equivalent percent.

The techniques and general method of polymerizing the mixed reactants are generally well known. See, for example, the U.S. Pat. Nos. 3,377,303 and 4,343,743. In general, the poly-(ester-amides) of the present invention may be prepared by charging a resin kettle with the reactants in proportions as hereinabove described and heating the mixture to a temperature at which random polymerization occurs. In general, the reactants are heated to a temperature of from about 130° to 160° C. to initiate polymerization, and thereafter at a temperature sufficient to distill off the water of condensation. The temperature at which this condensation polymerization is carried out is not critical, but is advantageously carried out at a temperature of from about 60° C. to about 300° C., preferably within the range of from about 180° C. to about 280° C. Preferably the heating is carried out under an inert gas atmosphere such as under a blanket of nitrogen gas. To assist the polymerization, a polymerization catalyst may be added in a catalytic proportion. Representative of such catalysts are phosphoric acid and tin oxalate, manufactured by M&T Chemicals as FASCAT 2001. The catalyst employed in the method of the invention may be charged to the initial reaction mixture or added just prior to when the polymerization rate slows. The preferred concentration of catalyst in the reaction is within the range of from about 0.001 to 3 weight percent most preferably 0.01 percent by weight of the total charge.

In addition, it is understood that small amounts of surface active materials may be added to the polymerization to reduce foaming. Representative of such materials is Dow-Corning DB-100, silicon anti-foam.

It is advantageous to also include an antioxidant as a component of the polymerization reaction mixture. Any of the well known antioxidants may be employed in conventional proportions; i.e., from 0.1 to about 2 percent by weight of the reactants.

The heating of the reaction mixture may be carried out until a selected viscosity of the reaction mixture is reached, e.g., 1,000-100,000 cps at 195° C. and preferably 7,500-20,000 cps at 195° C. In addition, small amounts (0.1 to 10 equivalent percent) of a saturated linear carboxylic acid containing 5-20 carbons; for example—stearic acid, palmitic acid, or other reactive monomers such as phenyl benzoate or triphenylphosphite, may be added to the mixture to control molecular weight and viscosity.

The relative quantities of the reactants are selected so that substantially equivalent numbers of reactive carboxyl and amine or alcohol groups are present in the reaction mixture to produce a neutral or balanced poly(ester-amide). Slight excesses of carboxyl or amine and alcohol are acceptable, but this ratio is preferably maintained between 0.9:1 and 1.1:1.

The method of the present invention may be carried out at atmospheric or slightly higher pressure. However, toward the end of the polymerization step, it is advantageous to operate under a vacuum. This aids in removal of by-products, solvent (if any), water of condensation, and unreacted diamine and in driving the polymerization to completion. Polymerization is complete within about 1 to 20 hours, depending on the specific nature of the acid reactants. Any conventional and convenient reactor vessel may be used to condense the reactants and carry out the polymerization.

The following examples describe the manner and process of making and using the invention and set forth the best mode contemplated by the inventor of carrying out the invention, but are not be construed as limiting.

TEST METHODS

The test methods used for evaluating the poly(ester-amide) compositions of the invention as hot-melt adhesives are as follows:

(1) Tensile and elongation tests—the method of reference ASTM D-1708-66 was used wherein resin dumbbells are conditioned at 72° F. and 50 percent relative humidity for 24 hours unless otherwise specified and then tested at a cross-head speed of 5 cm/min. on an Instron tester to demonstrate rate of force effect on elongation and tensile strengths.

(2) Softening points were determined by the method of ASTM-E 28-63 (ring and ball method).

(3) T-peel strengths were determined by ASTM test method D-1876-72 at 60° C. and at 22° C.

(4) Melt viscosities were determined by the test method described in ASTM D-1084-63.

(5) Lap shear strengths were determined by the test method described in ASTM D-1002-72.

(6) Water absorptions were determined by ASTM D-570-63 after 7 days of immersion.

EXAMPLES

Examples 1 and 2

These examples are not examples of the present invention, but are presented for comparative purposes only.

Example 1

A polymer was prepared with the following reactants:

|  | Equivalent % |
| --- | --- |
| polymeric fatty acid* | 70.0 |
| sebacic acid | 30.0 |
| ethylenediamine | 55.0 |
| 1,6-hexamethylenediol | 45.0 |

*Union Camp Corporation, Wayne, New Jersey, Unidyme ® 14 having the composition
monomer 0.4 wt. %
dimer 95.6 wt. %
trimer (and higher polymer) 4.0 wt. %

The reactants were all charged in a resin kettle and refluxed at a temperature of 120°-160° C. with stirring under a blanket of nitrogen gas for 3 hours. The mixture was then heated gradually from reflux temperature to 200° C. while water was removed by distillation. Fascat 2001 (1.2 grams) catalyst was added and the mixture was heated at temperatures of 200° C. to 235° C. under a vacuum of 0.05-5 mm Hg. After 2 hours, the viscosity of the polymer was determined to be 6,000 cps at 195° C., so the melt was stirred under vacuum for an additional hour. Antioxidant was added, and the melt was stirred for 10 minutes under a nitrogen purge and then for 10 minutes under vacuum. The polymer was poured onto Teflon-coated release paper and allowed to cool.

Example 2

The procedure of Example 1, supra., was repeated except that the proportions of reactants were changed. The proportions, reactants, and physical properties observed are set forth in Table 1.

TABLE 1

| Reactant | Example 2 Equiv. % | Example 3 Equiv. % | Example 4 Equiv. % |
|---|---|---|---|
| Polymeric Fatty Acid (Unidyme ® 14) | 87.7 | 70.0 | 87.7 |
| 1,18-Octadecanedicarboxylic Acid (SL-20 ®) |  | 30.0 | 12.3 |
| Sebacic Acid | 12.3 |  |  |
| Ethylenediamine | 37.3 | 55.0 | 37.3 |
| 1,6-Hexamethylenediol | 62.7 | 45.0 | 62.7 |
| Stearic Acid |  | 0.2 | 1.0 |

Examples 3 and 4

The procedure of Example 1, supra., was repeated except that 1,18-octadecanedicarboxylic acid** was used to replace the sebacic acid and/or the proportions of reactants were changed. The proportions and the reactants are set forth in Table 1. The physical properties observed are set forth in Table 2. Example 3 should be compared with Example 1; and Example 4 should be compared with Example 2.

** SL-20, produced by Okamura Oil Mills, Ltd., of Japan, contains 85–90 percent by weight 1,18-octadecanedicarboxylic acid and 4–10 percent by weight of 1,14-dodecanedicarboxylic acid.

As can be observed from the Examples 3 and 4 above, the poly(ester-amides) made with 1,18-octadecanedicarboxylic acid had higher tensile strengths, higher moduli, and lower water absorption, relative to the comparative polymers prepared with sebacic acid and dimer acid.

Examples 5 and 6

These polymers were prepared to demonstrate that a variety of diols and diamines may be successfully incorporated into this kind of poly(ester-amide).

For Example 5, into a 1.5 l resin kettle were charged Unidyme ® 14 (175.1 g), SL-20 ® (395.4 g), cyclohexanedimethanol (Eastman Chemical, 84.6 g), piperazine (Aldrich Chemical, 81.7 g), and two drops of phosphoric acid. The mixture was heated to reflux (155° C.) for 30 minutes, then, with removal of water, to 220° C. over about 2 hours. Vacuum was then applied for about 1.5 hours while the reaction mass was held at 225° C. Antioxidant was then added and the polymer melt stirred an additional 10 minutes. The product was then poured onto Teflon-coated release paper and allowed to cool. The product had a softening point of 90°–92° C. and a viscosity at 195° C. of 2,500 cps.

For Example 6, this procedure was repeated with a charge of Unidyme ® 14 (328.4 g), SL-20 (192.2 g), cyclohexanedimethanol (83.1 g), 4,4'-methylenebis(cyclohexylamine) (124.7 g), and stearic acid (8.6 g). The product polymer had a softening point of 151°–153° C. and a viscosity at 204° C. of 48,500 cps.

What is claimed is:

1. A poly(ester-amide) adhesive composition which comprises the product of the polymerization of:
   (a) from about 95 to about 40 equivalent percent of a polymeric fatty acid and from about 5 to about 60 equivalent percent of eicosanedioic acid (1,18-octadecanedicarboxylic acid); and
   (b) a substantially equivalent amount of from about 30 to about 90 equivalent percent of an organic diamine and from about 70 to about 10 equivalent percent of an organic diol.

2. The poly(ester-amide) adhesive composition of claim 1, wherein the organic diamine is selected from the group consisting of ethylenediamine, 1,3-propanediamine, 1,4-butanediamine, 1,6-hexamethylenediamine, piperazine, and 4,4'-methylenebis(cyclohexylamine).

3. The poly(ester-amide) adhesive composition of claim 1, wherein the organic diol is selected from the group consisting of ethylene glycol, 1,3-propanediol, 1,4-butanediol, 1,6-hexamethylenediol, cyclohexanedimethanol, and polyethylene glycol, polybutylene glycol and other polyalkylene oxides.

4. The poly(ester-amide) adhesive compositions as defined in claim 1 have application as hot-melt adhesives.

TABLE 2

| | | | POLY (ESTER-AMIDE) PROPERTIES | | | | | |
|---|---|---|---|---|---|---|---|---|
| | | | ROOM TEMPERATURE TENSILE PROPERTIES | | | ADHESIVE PROPERITES | | |
| Example Number | Softening Point, °C. | Melt Viscosity CPS at 195° C. | psi Modulus | Tensile Strength (psi) | % Elongation | Lap Shear Strength (psi) | T-Peel Strength (psi) | 7-Day Moisture Absorption wt. % |
| 1 | 167 | 8,700 | 7,001 | 914 | 721 | 836 | 2 | 0.653 |
| 3 | 132 | 10,500 | 37,040 | 1,902 | 694 | 767 | 1 | 0.231 |
| 2 | 104 | 7,700 | 800 | 209 | 666 | 387 | 12 | 0.761 |
| 4 | 95 | 10,100 | 2,371 | 357 | 846 | 300 | 15 | 0.472 |